US012600242B2

(12) United States Patent
Stjernberg et al.

(10) Patent No.: US 12,600,242 B2
(45) Date of Patent: Apr. 14, 2026

(54) COMPUTER-IMPLEMENTED METHOD OF CONTROLLING FUTURE BRAKING CAPACITY OF A VEHICLE TRAVELLING ALONG A ROAD

(71) Applicant: Volvo Truck Corporation, Gothenburg (SE)

(72) Inventors: Oscar Stjernberg, Gothenburg (SE); Martin Wilhelmsson, Torslanda (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 180 days.

(21) Appl. No.: 18/478,356

(22) Filed: Sep. 29, 2023

(65) Prior Publication Data

US 2024/0123833 A1 Apr. 18, 2024

(30) Foreign Application Priority Data

Oct. 17, 2022 (EP) ..................................... 22201863

(51) Int. Cl.
*G06F 17/00* (2019.01)
*B60L 7/18* (2006.01)
(Continued)

(52) U.S. Cl.
CPC ................. *B60L 7/18* (2013.01); *B60L 50/60* (2019.02); *B60L 58/10* (2019.02)

(58) Field of Classification Search
CPC .. B60L 7/18; B60L 50/60; B60L 58/10; B60L 2200/18; B60L 2200/36; B60L 7/22; B60L 7/24; B60L 58/15; B60L 15/2018
(Continued)

(56) References Cited

U.S. PATENT DOCUMENTS 9,205,839 B2 12/2015 Lennevi et al.
12,208,705 B2 * 1/2025 Lindberg .................. B60L 7/10
(Continued)

FOREIGN PATENT DOCUMENTS

WO 2022177491 A1 8/2022
WO 2022214190 A1 10/2022

OTHER PUBLICATIONS

Software for high-fidelity electric vehicle en route state of charge estimation (Year: 2021).*
(Continued)

*Primary Examiner* — Ronnie M Mancho
(74) *Attorney, Agent, or Firm* — Sage Patent Group

(57) ABSTRACT

A computer-implemented method of controlling future braking capacity of a vehicle travelling along a road, the vehicle having onboard batteries that are configured to absorb energy from regenerative braking. The method comprises acquiring prediction data indicative of how much braking capacity will be needed for the vehicle in an upcoming downhill slope in which a regenerative braking event is anticipated; controlling, based on the acquired prediction data, the application of resistor brakes of the vehicle before said upcoming downhill slope, thereby increasing the propulsion power needed to propel the vehicle at maintained speed, and controlling a traction motor of the vehicle so that the vehicle is propelled at maintained speed while the resistor brakes are applied, thereby reducing the state of charge (SOC) of the onboard batteries and enabling the onboard batteries to subsequently absorb energy from said anticipated regenerative braking event.

16 Claims, 4 Drawing Sheets

(51) Int. Cl.
  *B60L 50/60* (2019.01)
  *B60L 58/10* (2019.01)
(58) Field of Classification Search
  USPC ........................................................... 701/22
  See application file for complete search history.

(56) References Cited

U.S. PATENT DOCUMENTS

| | | | |
|---|---|---|---|
| 12,291,188 B2 * | 5/2025 | Gesang ................ | B60W 10/26 |
| 2011/0125351 A1 | 5/2011 | Bauerle | |
| 2016/0243947 A1 | 8/2016 | Perkins et al. | |
| 2019/0039596 A1 | 2/2019 | Hawley | |
| 2024/0227810 A1 * | 7/2024 | Lindberg ................ | H02K 1/06 |
| 2024/0367653 A1 * | 11/2024 | Larsson ............... | B62D 35/001 |

OTHER PUBLICATIONS

Extended European Search Report, European Application No. 22201863. 2, mailed Mar. 16, 2023, 9 pages.

\* cited by examiner

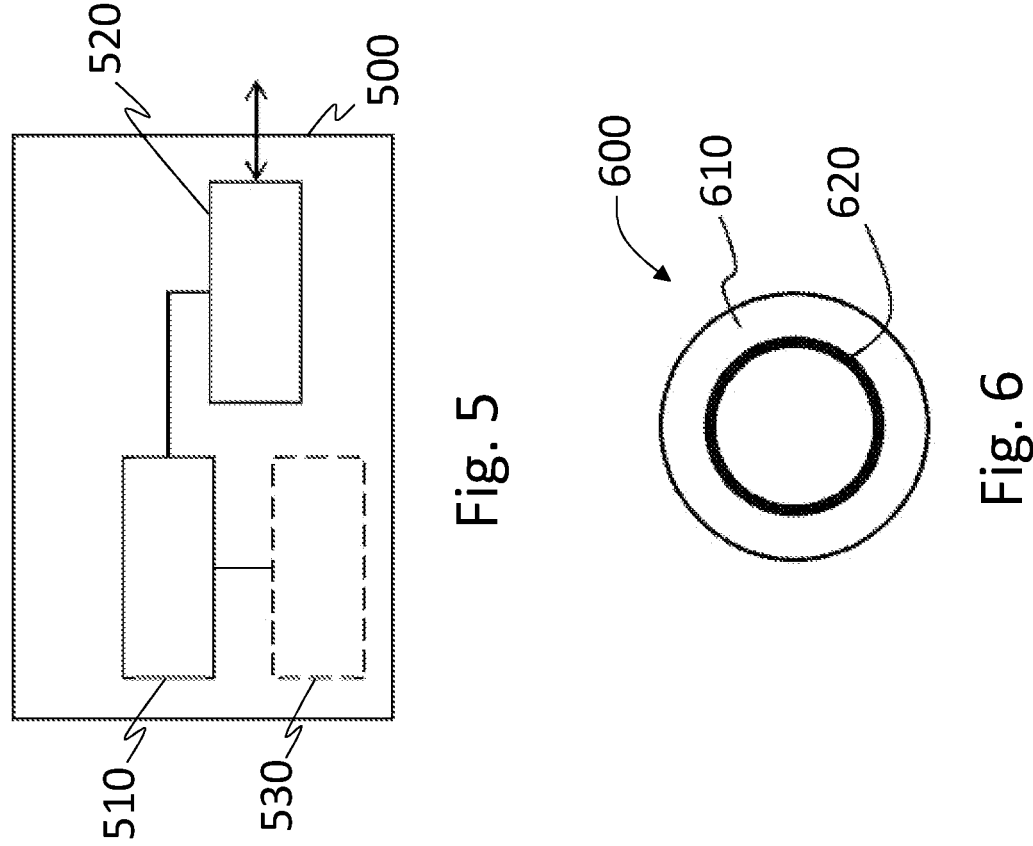
Fig. 5
Fig. 6
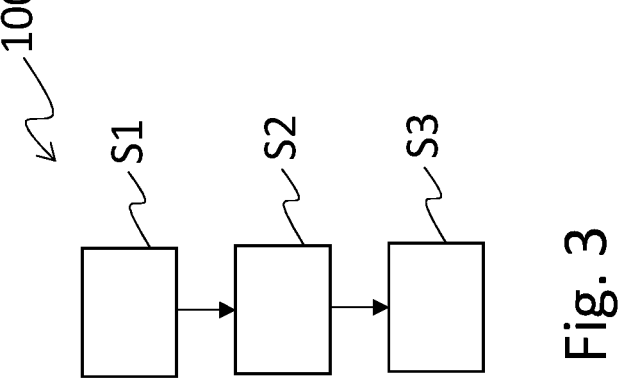
Fig. 3

COMPUTER-IMPLEMENTED METHOD OF CONTROLLING FUTURE BRAKING CAPACITY OF A VEHICLE TRAVELLING ALONG A ROAD

CROSS REFERENCE TO RELATED APPLICATIONS

This application claims priority to European Patent Application No. 22201863.2 filed on Oct. 17, 2022, the disclosure and content of which is incorporated by reference herein in its entirety.

TECHNICAL FIELD

The disclosure relates generally to controlling vehicle braking capacity. In particular aspects, the disclosure relates to a computer-implemented method of controlling future braking capacity of a vehicle travelling along a road. The disclosure can be applied in heavy-duty vehicles, such as trucks, buses, and construction equipment. Although the disclosure may be described with respect to a particular vehicle, the disclosure is not restricted to any particular vehicle.

BACKGROUND

Braking events for battery electric vehicles (BEV) or fuel cell electric vehicles (FCEV) may be dependent on various factors, such as disc brake temperature, battery state of charge (SOC) and braking resistor capacity. When braking with fuel cell electric vehicles, the braking energy may be captured via regenerative braking which converts the kinetic energy of the vehicle into electrical energy that recharges the onboard batteries, thus increasing the SOC. However, such regenerative braking only works if there is capacity the batteries to increase the SOC. If the onboard batteries are fully charged, regenerative braking is not possible. In that event, the mechanical brakes of the vehicle may be applied. Mechanical brakes, such as drum or disc brakes, have a temperature limit until they become inefficient. If this happens the mechanical brakes may lose their braking capability which may be devastating. This is known as brake fade.

SUMMARY

According to a first aspect of the disclosure, there is provided a computer-implemented method of controlling future braking capacity of a vehicle travelling along a road, the vehicle having onboard batteries that are configured to absorb energy from regenerative braking, the method comprising:

acquiring, by a processor device of a computer system, prediction data indicative of how much braking capacity will be needed for the vehicle in an upcoming downhill slope in which a regenerative braking event is anticipated, controlling, by the processor device, based on the acquired prediction data, the application of resistor brakes of the vehicle before said upcoming downhill slope, thereby increasing the propulsion power needed to propel the vehicle at maintained speed, and controlling, by the processor device, a traction motor of the vehicle so that the vehicle is propelled at maintained speed while the resistor brakes are applied, thereby reducing the state of charge (SOC) of the onboard batteries and enabling the onboard batteries to subsequently absorb energy from said anticipated regenerative braking event. The first aspect of the disclosure may seek to improve the ability of the vehicle to handle the braking energy required in a downhill slope in an efficient and safe manner A technical benefit may include that by controlling the resistor brakes to increase the propulsion power needed to propel the vehicle at maintained speed, the SOC of the onboard batteries may be reduced to a level which is sufficient to avoid the risk of the SOC becoming full in combination with too high mechanical brake temperatures and therefore non-functioning mechanical brakes. By using prediction for future braking events and how much braking capacity will be needed, the vehicle may thus prepare for such an event by applying resistor brakes when it would normally not be considered as necessary and may thus lower the SOC in the batteries due to the more power being needed to propel the vehicle forward.

Using resistor brakes for reducing the SOC in preparation for the anticipated regenerative braking event is beneficial since it "burns" then energy directly from the onboard batteries. Furthermore, using a resistor brake for reducing the SOC in preparation for the anticipated regenerative braking event is also beneficial since it can be applied for a very long time as long as the resistor brake is kept cooled. Resistor brakes have substantially no tear during usage. In contrast, mechanical brakes are subject to wear and tear during usage and may risk becoming overheated, and thus risking brake fade. Thus, a further advantage of using the resistor brakes in anticipation of the regenerative brake event is a possible extended durability of the mechanical brakes of the vehicle.

In some examples, the method further comprises:

determining, by the processor device, a target SOC of the onboard batteries based on the acquired prediction data, and stopping, by the processor device, said application of resistor brakes when said target SOC has been reached for the onboard batteries. A technical benefit may include that when a determined target SOC has been reached the resistor braking may be disabled and the vehicle may continue as normal but with a battery SOC that is low enough to absorb anticipated future regenerative braking energy.

In some examples, the acquired prediction data comprises a value of an expected amount of energy that the onboard batteries would absorb during the anticipated regenerative braking event in the upcoming downhill slope assuming unlimited battery capacity. A technical benefit may include that by knowing how much energy would be desired to absorb in the batteries (i.e. assuming unlimited battery capacity), the processor device may determine whether or not the batteries have enough capacity. If there is not enough capacity, the processor device may calculate how much resistive braking that will be required. In such case the target SOC may be set to a minimum (which should suitably always be greater than 0%). However, if there is enough capacity even if the SOC is not reduced to a minimum, then the target SOC may be set accordingly.

In some examples, the acquired prediction data comprises an expected future reduction in SOC due to an uphill climb before said upcoming downhill slope, assuming the application of the regenerative brakes has been stopped. A technical benefit may include that by taking into account a future SOC reduction due to an uphill climb before the following downhill slope, the processor device may limit the application of regenerative braking, thereby reducing the risk of unnecessary energy consumption.

In some examples, the method further comprises determining, by the processor device, based on said determined target SOC, at least one of the following parameters:

a point in time for starting said application of resistor brakes, a location along the road for starting said application of resistor brakes, a value of braking power, energy or torque to be applied by said resistor brakes.

A technical benefit may include that, by determining a point in time for starting said application of resistor brakes, sufficient time may be present for reducing the current SOC to said target SOC. Similarly, by a location may be selected sufficiently far ahead of the upcoming downhill slope to that the target SOC is reached before energy is being regenerated in the downhill slope. Furthermore, by selecting a value of the braking power, energy or torque to be applied by said resistor brakes, the required propulsion power for maintaining the vehicle speed may be effectively controlled, and thus the rate of reduction of the SOC may be effectively controlled.

In some examples, said determining of the at least one parameter comprises:

determining, by the processor device, the current speed of the vehicle, and based on the determined current speed of the vehicle, determining, by the processor device, the at least one parameter.

A technical benefit may include, that by determining the current speed of the vehicle, the processor device may conveniently, based on a certain (or different alternative) value(s) of braking power, braking energy or braking torque to be applied by the resistor brakes, calculate a time and/or location at which the resistor brakes should be applied for. Conversely, if time or distance to the next downhill slope is short (e.g. because SOC is almost full due to a recent downhill slope), then the processor device may, based on the current speed of the vehicle and the time/distance available to the next regenerative brake event, calculate an appropriate value for said braking power, braking energy or braking torque to be applied by the resistor brakes, in order to reach the target SOC for the next downhill slope.

In some examples, said determining of the at least one parameter comprises:

determining, by the processor device, the current state of charge of the vehicle, and based on the determined current state of charge, determining, by the processor device, the at least one parameter.

A technical benefit may include that by knowing the current state of charge, the processor device can calculate said at least one parameter (time, location and/or value of power/energy/torque) so that the SOC is reduced from the current SOC to said target SOC before the anticipated regenerative braking event begins.

In some examples, said determining of the at least one parameter comprises:

accessing, by the processor device, stored historical control data representing previous control actions by the processor device, and based on said stored historical control data, determining, by the processor device, the at least one parameter.

A technical benefit may include that, if a vehicle, for instance, often travels on the same road under similar conditions (e.g. same load, same speed etc.), then control actions from previous occasions on the same road may be reused or improved. For instance, if for some reason the stored historical data shows that the target SOC has previously been set to a too low level for a certain downhill slope (i.e. after the regenerative braking during the downhill slope, the onboard batteries still had capacity to store more energy), then the next time the target SOC may be adjusted to a higher level. Hereby, unnecessary loss of energy may be avoided.

In some examples, said prediction data comprises information about the topography of an upcoming road segment which comprises said upcoming downhill slope, wherein said information about the topography comprises information such as a length and/or an inclination of said upcoming downhill slope. A technical benefit may include that the topography of the downhill slope may allow the processor device to conveniently determine the braking power/energy that is required to keep the speed of the vehicle within a desired speed limit. For instance, the inclination of the downhill slope affects the braking power required, and the length of the downhill slope affects the braking energy required.

In some examples, in said prediction data, said brake capacity that will be needed for the vehicle in the downhill slope includes, assuming SOC is expected to reach 100% due to the anticipated regenerative braking event in the downhill slope:

an expected value of a brake torque, power or energy to be applied by mechanical brakes of the vehicle in the downhill slope following said anticipated regenerative braking, and/or an expected value of energy to be dumped into the resistive brakes following said anticipated regenerative braking.

A technical benefit may include that, in cases when the SOC is expected to reach 100% (e.g. in long and/or steep downhill slopes) the brake capacity may be distributed between different types of braking component (mechanical brakes and resistive brakes) or may be calculated for just one type of braking component. Thus, increased flexibility may be provided for acquiring said prediction data.

In some examples, said prediction data may include position data such as from a GPS system. In some examples, said prediction data may include road speed.

In some examples, said vehicle is a fuel cell electric vehicle (FCEV), a battery electric vehicle (BEV) or a hybrid vehicle. A technical benefit may include that the method may be implemented for various types of vehicles in which regenerative energy may be stored in onboard batteries, and is thus not limited to a particular vehicle propulsion system. For instance, in a hybrid vehicle that has both an electric motor and a diesel engine, although it is possible to reduce the SOC by only using the electric motor, this may not be enough to reach the target SOC. However, in accordance with the disclosure, by applying resistor brakes, the electric motor will need to consume more energy to maintain the speed of the vehicle, thereby allowing a more effective reducing of the current SOC to the target SOC.

According to a second aspect of the disclosure, there is provided a computer system comprising the processor device configured to perform the method of the first aspect, including any example thereof. The second aspect of the disclosure may seek to address the corresponding matters and may present the corresponding technical benefits as the method of the first aspect, including any examples of the method of the first aspect.

According to a third aspect of the disclosure, there is provided a vehicle comprising the processor device to perform the method of the first aspect, including any example thereof. The third aspect of the disclosure may seek to address the corresponding matters and may present the corresponding technical benefits as the method of the first aspect, including any examples of the method of the first aspect.

According to a fourth aspect of the disclosure, there is provided a computer program product comprising program code for performing, when executed by the processor device, the method of the first aspect, including any example thereof. The fourth aspect of the disclosure may seek to address the corresponding matters and may present the corresponding technical benefits as the method of the first aspect, including any examples of the method of the first aspect.

According to a fifth aspect of the disclosure, there is provided a control system comprising one or more control units configured to perform the method of the first aspect, including any example thereof. The fifth aspect of the disclosure may seek to address the corresponding matters and may present the corresponding technical benefits as the method of the first aspect, including any examples of the method of the first aspect.

According to a sixth aspect of the disclosure, there is provided a non-transitory computer-readable storage medium comprising instructions, which when executed by the processor device, cause the processor device to perform the method of the first aspect, including any example thereof. The sixth aspect of the disclosure may seek to address the corresponding matters and may present the corresponding technical benefits as the method of the first aspect, including any examples of the method of the first aspect.

The above aspects, accompanying claims, and/or examples disclosed herein above and later below may be suitably combined with each other as would be apparent to anyone of ordinary skill in the art.

Additional features and advantages are disclosed in the following description, claims, and drawings, and in part will be readily apparent therefrom to those skilled in the art or recognized by practicing the disclosure as described herein. There are also disclosed herein control units, computer readable media, and computer program products associated with the above discussed technical benefits.

BRIEF DESCRIPTION OF THE DRAWINGS

With reference to the appended drawings, below follows a more detailed description of aspects of the disclosure cited as examples.

FIG. 3 is a schematic illustration of acts included in the method of the disclosure, in accordance with at least one example.

FIG. 5 schematically illustrates a processor device according to one example.

FIG. 6 schematically illustrates a computer program product according to one example.

DETAILED DESCRIPTION

Aspects set forth below represent the necessary information to enable those skilled in the art to practice the disclosure.

Figure 1:
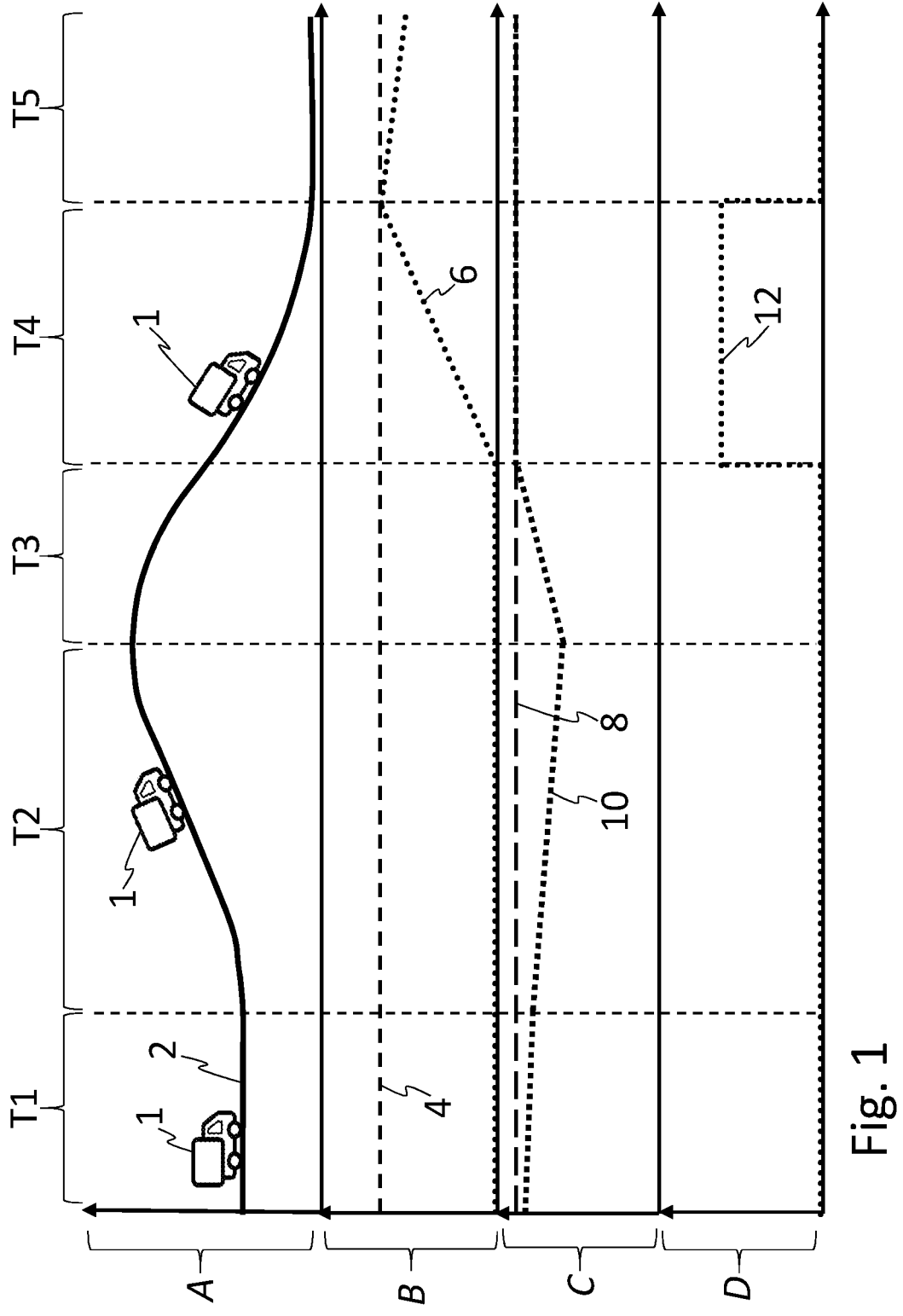
FIG. 1 is a schematic illustration of a traditional brake event for a fuel cell electric vehicle driving up and down a hill.

FIG. 1 is a schematic illustration of a traditional brake event for a fuel cell electric vehicle 1 driving up and down a hill. The vehicle 1 is illustrated as a truck, i.e. a type of heavy duty vehicle, which requires relatively high braking power in downhill travel compared to lighter vehicles such as cars.

In more detail, the schematic diagram in FIG. 1 is divided into four horizontal sections. A first horizontal section A, at the top of the diagram, represents the topography of a road segment 2 of a road along which the vehicle 1 travels. A second horizontal section B represents the temperature of mechanical brakes. In this second horizontal section B the straight horizontal dashed line 4 illustrates a maximum allowable brake temperature for ensuring that the brakes are still functional. In this second horizontal section B a dotted line 6 illustrates how the actual brake temperature varies as the vehicle 1 travels along the illustrated road segment 2. A third horizontal section C represents the state of charge (SOC) of the onboard batteries. In this third horizontal section C a straight horizontal dashed line 8 represents SOC equals 100%. In this third horizontal section C a dotted line 10 illustrates how the actual SOC varies as the vehicle 1 travels along the illustrated road segment 2. A fourth horizontal section D, at the bottom of the diagram, represents the power applied by the mechanical brakes. In this fourth horizontal section D a dotted line 12 illustrates how the applied braking power varies as the vehicle 1 travels along the road segment 2.

The schematic diagram in FIG. 1 is also divided into five vertical sections T1-T5. The five vertical sections T1-T5 may, for instance, be considered to represent different time slots. The first vertical section T1 represents the time during which the vehicle 1 is initially travelling on a relatively flat part of the illustrated road segment 2. Next, in the second vertical section T2, the vehicle 1 climbs up a hill up to a crest. In the third vertical section T3, as the vehicle 1 has passed the crest, it now begins to travel downhill. In the fourth vertical section T4, the vehicle 1 is still travelling along the same downhill slope. Finally, in the fifth vertical section T5, the vehicle 1 has left the downhill slope and is once again travelling on a substantially flat part of the illustrated road segment 2.

While the vehicle 1 drives uphill (i.e. during T2) the battery state of charge (SOC) is decreased, as illustrated by dotted line 10 in horizontal section C. Thus, the output energy from the fuel cell is not enough to propel the vehicle 1 uphill. When the vehicle 1 starts driving downhill (i.e. during T3) and regenerative braking is started, the SOC in the onboard batteries is increased, as illustrated by the dotted line 10 turning upwards. Furthermore, excess energy from the fuel cell is stored in the onboard batteries as well. At a certain point (here illustrated when T3 turns into T4), the actual SOC reaches 100% and regenerative braking is not possible anymore, as illustrated by dotted line 10 reaching the dashed line 8 that represents 100% SOC. At this point, mechanical and/or the resistor braking may be used to absorb the energy of the truck. For instance, during the continued travel in the downhill slope (i.e. during T4), the mechanical brakes are applied with a certain power, as illustrated by the dotted line 12 in horizontal section D. This leads to a rise in temperature of the mechanical brakes, as illustrated by the rising dotted line 6 in horizontal section B. In the illustration of FIG. 1, the temperature of the mechanical brakes, i.e. dotted line 6, reaches the maximum allowable temperature represented by dashed line 4, just in time when the flat part of the road segment starts (i.e. at T5) and brake power no longer needs to be applied, i.e. dashed line 12 goes down to zero. During the flat part (i.e. during T5), the brake temperature is allowed to become lower, as illustrated by the downward direction of the dotted line 6. In the illustration in FIG. 1, the vehicle 1 was on the boarder of exceeding the maximum allowable temperature in horizontal section B, i.e. the dotted line 6 was almost about to exceed the dashed line 4. If the downhill slope would have been somewhat longer, that could indeed have happened upon continued application of the mechanical brakes. That could have led to overheating of the brakes and thus render the brakes non-functional, which could have led to a serious accident.

Figure 2:
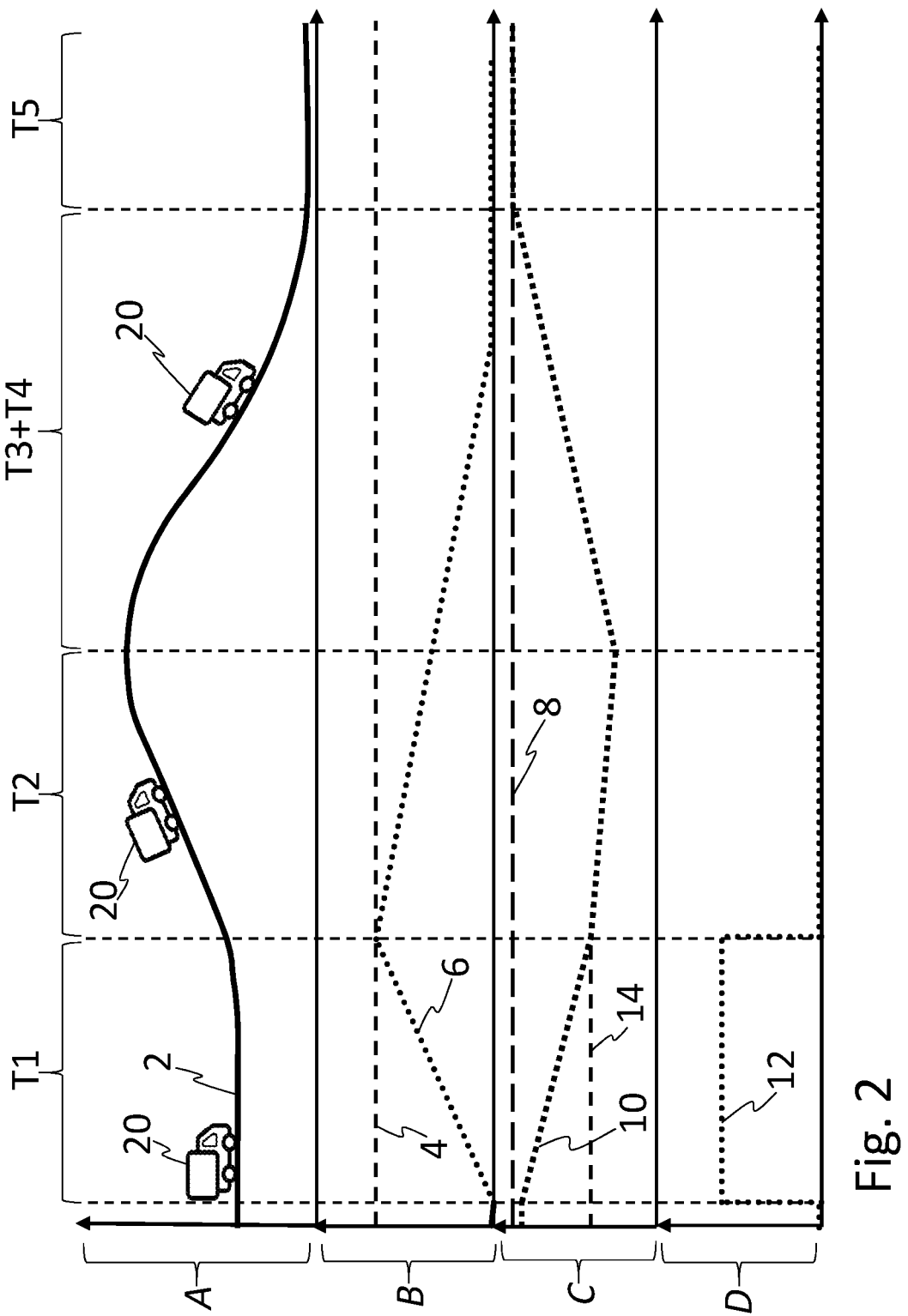
FIG. 2 is a schematic illustration of a brake event in which the teaching of the present disclosure is implemented.

FIG. 2 is a schematic illustration of a brake event in which the teaching of the present disclosure is implemented. The illustrated vehicle 20 may, for example, be a fuel cell electric vehicle. However, examples presented in this disclosure are readily applicable to any other vehicle having onboard batteries which can store regenerative energy upon regenerative braking. Thus, the vehicle 20 could, instead of being a fuel cell electric vehicle, for example be a battery electric vehicle or even a hybrid vehicle.

In FIG. 2 the same reference signs A-D, T1-T5, 2, 4, 6, 8, 10 and 12 are used as for FIG. 1. However, as will be understood, the variation of the dotted line 6 (actual brake temperature), the dotted line 10 (actual SOC) and the dotted line 12 (applied brake power) is different compared to the respective variation in FIG. 1. The reason for this will be explained in the following.

The vehicle 20 may be equipped with a processor device of a computer system. However, the processor device may in other examples be an off-board processor device, with which the vehicle 20 may communicate, for example, via telematics network. The processor device is configured to acquire prediction data indicative of how much braking capacity will be needed for the vehicle 20 in the upcoming downhill slope (i.e. during T3 and T4) in which a regenerative braking event is anticipated. The prediction data may e.g. comprise positioning information from a GPS system of the vehicle 20 (or any other appropriate global navigation satellite system, GNSS), topographic data from remote servers, the speed of the vehicle 20 from speed sensors, the total weight of the vehicle 20 form load sensors, etc. For instance, when the vehicle 20 is travelling at a certain speed in cruise control mode, and the processor device has knowledge of the total weight of the vehicle 20, and knowledge of the grade and the length of the downhill slope, the processor device may calculate/estimate the acceleration force resulting from the downhill slope that needs to be counteracted by a brake force to maintain the cruising speed. Since power equals force times velocity, the brake power to be applied during the downhill slope can be determined. Assuming constant speed and knowing the length of the downhill slope, the time to travel along the downhill slope at constant speed can also be calculated/estimated, and hence the brake energy that will be required to maintain the speed can also be calculated/estimated (power=energy/time). In other words, based on the prediction data, the processor device may determine how much energy that could be produced due to regenerative braking along the entire downhill slope. Put differently, the processor device can determine how much the dotted line 10 should be able to rise during the downhill slope (i.e. during T3+T4). The processor device can determine if the onboard batteries of the vehicle 20 will be able to absorb that much energy when the vehicle will reach the downhill slope. In other words, the processor device can determine the SOC that the vehicle 20 is expected to have at the crest before starting to absorb energy in the downhill slope. If that expected SOC is too high, such that the batteries will not be able to absorb all generated energy in the downhill slope, i.e. the batteries would reach 100% SOC prematurely, then the processor device may actively control resistor brakes in advance in order to sufficiently lower the SOC in good time.

Thus, as illustrated in FIG. 2, in anticipation of the upcoming downhill slope, the processor device activates resistor brakes while controlling the traction motor of the vehicle 20 to main the speed of the vehicle. In this example, the control action is already initiated in the first flat part (during T1) of the road segment 2. Since the processor device is also aware of the uphill part (T2) of the road segment, including the grade and length of the uphill part, the processor device can estimate/calculate how much the SOC will be lowered due to the uphill climb (T2), i.e. how much dotted line 10 will be lowered during T2. However, since that reduction of the SOC, i.e. lowering of dotted line 10 (during T2) would not on its own be enough, as the expected increase in the downhill slope (T3+T4) is far greater, current SOC is actively reduced by providing braking action already in the flat part (T1). Thus, as illustrated, during T1, the resistor brakes are applied as shown by dotted line 12 in horizontal section D. This causes the current SOC, dotted line 10 in horizontal section C, to be lowered. The total reduction of the current SOC, i.e. total lowering of the dotted line 10, during T1 and T2, is sufficient to enable the batteries to absorb all energy that is generated during regenerative braking in the downhill slope (T3+T4).

As can also be seen in FIG. 2 the brake temperature (dotted line 6) will rise during T1 due to the brake action (dotted line 12), but will then cool down for the rest of the road segment 2. It should be understood that this is just one example, and the processor device may adapt to the actual circumstances. For instance, if the downhill slope is very long and/or steep, and the magnitude of the possible regenerative energy is larger than the capacity of the batteries even if the battery SOC would be more or less empty, then the processor device may control the initial resistor brake action to lower the SOC to a low level (almost empty) and then in the downhill slope when the SOC has reached 100%, again apply brakes (e.g. mechanical and/or resistor brakes).

As can be understood from FIG. 2, the processor device may suitably determine a target SOC for the onboard batteries based on the acquired prediction data. In FIG. 2 the target SOC is indicated by dashed line 14. The processor device may stop the applying of the resistor brakes when the target SOC has been reached for the onboard batteries. Thus, as illustrated in FIG. 2, the actual SOC (dotted line 10) decreases during T1, due to the applied resistor brakes (dotted line 12), but when it reaches the target SOC (dashed line 14), the applying of the brakes is stopped.

The processor device may further determine, based on said determined target SOC (dashed line 14), at least one of the following parameters:

a point in time for starting said application of resistor brakes (which in FIG. 2 may correspond to the time when the vehicle is expected to enter section T1), a location along the road for starting said application of resistor brakes (which in FIG. 2 may correspond to the start of the section T1), a value of braking power, energy or torque to be applied by said resistor brakes (which in FIG. 2 may correspond to the value of the applied brake power (dashed line 12) in horizontal section D).

In some examples, said determining of the at least one parameter may comprise:

determining, by the processor device, the current speed of the vehicle 20 (e.g. by input data from a speed sensor or by input data from a cruise control module), and based on the determined current speed of the vehicle 20, determining, by the processor device, the at least one parameter. For example, in FIG. 2, based on the speed of the vehicle 20, the processor device can estimate/calculate how fast the vehicle 20 will reach different points along the illustrated road segment 2, such as how fast the vehicle 20 will reach the start of the uphill climb and the start of the downhill slope. Therefore, the processor may determine how much in advance and/or with what level of brake power the control action should be initiated for appropriate reduction of the current SOC.

In some examples, said determining of the at least one parameter comprises:

determining, by the processor device, the current state of charge of the vehicle 20, and based on the determined current state of charge, determining by the processor device, the at least one parameter. In other words, by knowing the target SOC, and knowing the current SOC, the processor device may determine when/where and how much brake power should be applied. In the example in FIG. 2 the current SOC is almost 100% when reaching the illustrated section T1. In another scenario, in which the current SOC would be considerably lower, then processor device may apply the brake power (dotted line 12) at a later point in time (for example in the middle of section T1) and/or provide a lower level of brake power compared to the level illustrated in FIG. 2. In such scenario, processor device would still control the traction motor of the vehicle 20 to maintain the speed of the vehicle 20 substantially unchanged, and therefore, upon application of said brake power, the current SOC would gradually be reduced.

In some examples, said determining of the at least one parameter comprises:

accessing, by the processor device, stored historical control data representing previous control actions by the processor device, and based on said stored historical control data, determining, by the processor device, the at least one parameter. Thus, in the example of FIG. 2, if the vehicle 20 has travelled this road segment 2 under similar conditions on previous occasions, for example carrying approximately the same load, such historical data can be used for determining when/where and how much brake power that should be applied for starting to actively reducing the SOC.

FIG. 3 is a schematic illustration of acts included in the method of the disclosure, in accordance with at least one example. More specifically, FIG. 3 illustrates a computer-implemented method 100 of controlling future braking capacity of a vehicle travelling along a road, the vehicle having onboard batteries that are configured to absorb energy from regenerative braking, the method comprising:

in a step S1, acquiring, by a processor device of a computer system, prediction data indicative of how much braking capacity will be needed for the vehicle in an upcoming downhill slope in which a regenerative braking event is anticipated, in a step S2, controlling, by the processor device, based on the acquired prediction data, the application of resistor brakes of the vehicle before said upcoming downhill slope, thereby increasing the propulsion power needed to propel the vehicle at maintained speed, and in a step S3, controlling, by the processor device, a traction motor of the vehicle so that the vehicle is propelled at maintained speed while the resistor brakes are applied, thereby reducing the state of charge (SOC) of the onboard batteries and enabling the onboard batteries to subsequently absorb energy from said anticipated regenerative braking event.

In some examples, the prediction data acquired in step S1 comprises a value of an expected amount of energy that the onboard batteries would absorb during the anticipated regenerative braking event in the upcoming downhill slope assuming unlimited battery capacity. For example, in the example in FIG. 2 said expected amount of energy would correspond to the rise of the dotted line 10 during T3+T4.

In some examples, the prediction data acquired in step S1 of FIG. 3 comprises an expected future reduction in SOC due to an uphill climb before said upcoming downhill slope, assuming the applying of the resistor brakes has been stopped. For example, in the example in FIG. 2 said expected future reduction in SOC due to an uphill climb is represented by the lowering of the dotted line 10 during T2.

In some examples, the prediction data acquired in step S1 may comprise information about the topography of an upcoming road segment which comprises said upcoming downhill slope, wherein said information about the topography comprises information such as a length and/or an inclination of said upcoming downhill slope.

In some examples, in said prediction data acquired in step S1, said brake capacity that will be needed for the vehicle in the downhill slope includes, assuming SOC is expected to reach 100% due to the anticipated regenerative braking event in the downhill slope:

an expected value of a brake torque, power or energy to be applied by mechanical brakes of the vehicle in the downhill slope following said anticipated regenerative braking, and/or an expected value of energy to be dumped into the resistive brakes following said anticipated regenerative braking.

Although this is not illustrated in FIG. 2, but in other scenarios in which the battery capacity is not large enough to absorb all the brake energy that needs to be applied in the downhill slope, then the processor device may suitably calculate how to allocate other braking options. For instance, if both resistive and mechanical braking is available, a distribution between the two may be determined to avoid overheating the mechanical brakes.

Figure 4:
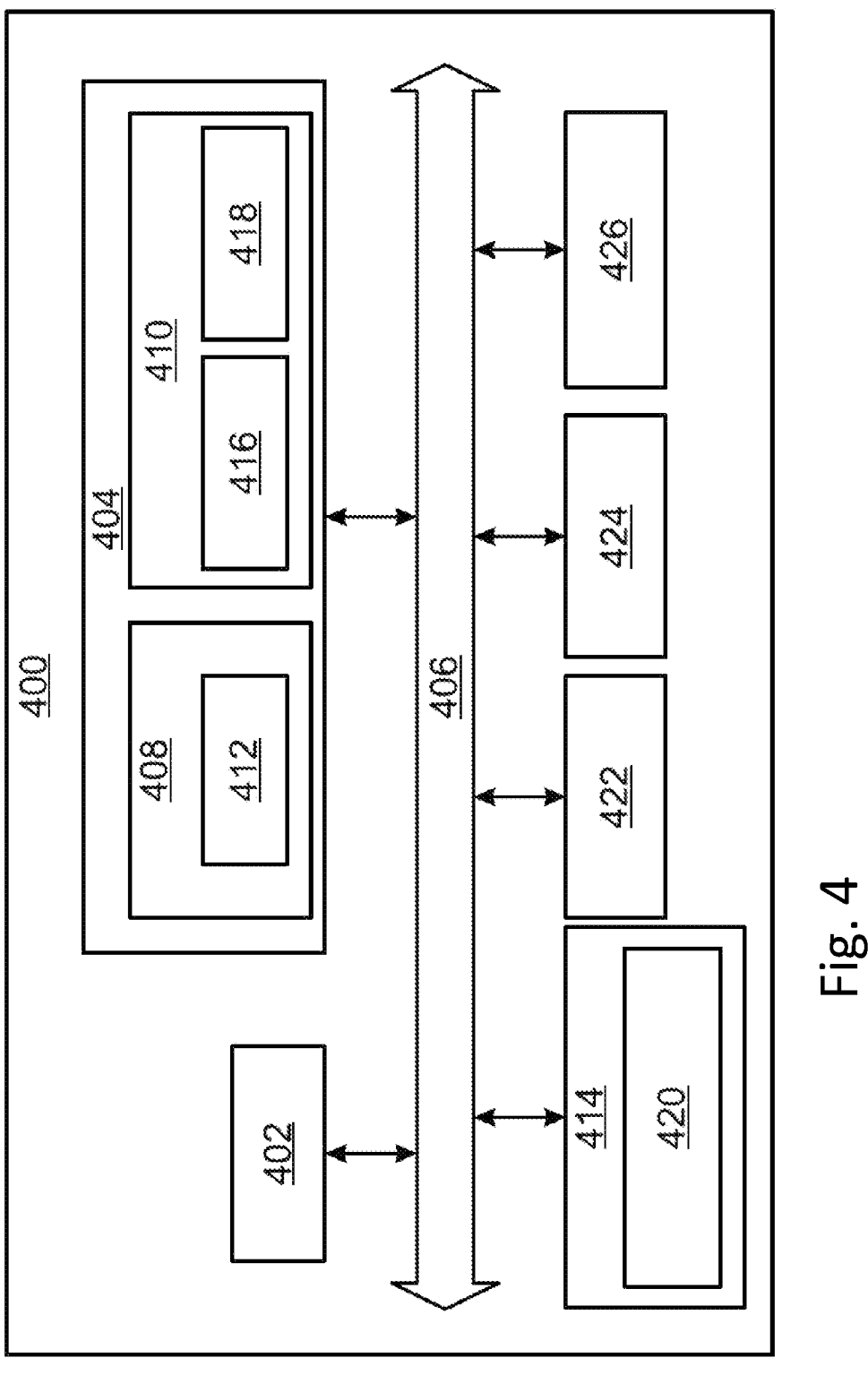
FIG. 4 is a schematic diagram of an exemplary computer system for implementing examples disclosed herein, according to one example.

FIG. 4 is a schematic diagram of an exemplary computer system 400 for implementing examples disclosed herein. The computer system 400 is adapted to execute instructions from a computer-readable medium to perform these and/or any of the functions or processing described herein. The computer system 400 may be connected (e.g., networked) to other machines in a LAN, an intranet, an extranet, or the Internet. While only a single device is illustrated, the computer system 400 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, etc., includes reference to one or more such devices to individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 400 may comprise at least one computing device or electronic device capable of including firmware, hardware, and/or executing software instructions to implement the functionality described herein. The computer system 400 may include a processor device 402 (may also be referred to as a control unit), a memory 404, and a system bus 406. The computer system 400 may include at least one computing device having the processor device 402. The system bus 406 provides an interface for system components including, but not limited to, the memory 404 and the processor device 402. The processor device 402 may include any number of hardware components for conducting data or signal processing or for executing computer code stored in memory 404. The processor device 402 (e.g., control unit) may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processor device may further include computer executable code that controls operation of the programmable device.

The system bus 406 may be any of several types of bus structures that may further interconnect to a memory bus (with or without a memory controller), a peripheral bus, and/or a local bus using any of a variety of bus architectures. The memory 404 may be one or more devices for storing data and/or computer code for completing or facilitating methods described herein. The memory 404 may include database components, object code components, script components, or other types of information structure for supporting the various activities herein. Any distributed or local memory device may be utilized with the systems and methods of this description. The memory 404 may be communicably connected to the processor device 402 (e.g., via a circuit or any other wired, wireless, or network connection) and may include computer code for executing one or more processes described herein. The memory 404 may include non-volatile memory 408 (e.g., read-only memory (ROM), erasable programmable read-only memory (EPROM), electrically erasable programmable read-only memory (EEPROM), etc.), and volatile memory 410 (e.g., random-access memory (RAM)), or any other medium which can be used to carry or store desired program code in the form of machine-executable instructions or data structures and which can be accessed by a computer or other machine with a processor device 402. A basic input/output system (BIOS) 412 may be stored in the non-volatile memory 408 and can include the basic routines that help to transfer information between elements within the computer system 400.

The computer system 400 may further include or be coupled to a non-transitory computer-readable storage medium such as the storage device 414, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 414 and other drives associated with computer-readable media and computer-usable media may provide non-volatile storage of data, data structures, computer-executable instructions, and the like.

A number of modules can be implemented as software and/or hard-coded in circuitry to implement the functionality described herein in whole or in part. The modules may be stored in the storage device 414 and/or in the volatile memory 410, which may include an operating system 416 and/or one or more program modules 418. All or a portion of the examples disclosed herein may be implemented as a computer program product 420 stored on a transitory or non-transitory computer-usable or computer-readable storage medium (e.g., single medium or multiple media), such as the storage device 414, which includes complex programming instructions (e.g., complex computer-readable program code) to cause the processor device 402 to carry out the steps described herein. Thus, the computer-readable program code can comprise software instructions for implementing the functionality of the examples described herein when executed by the processor device 402. The processor device 402 may serve as a controller or control system for the computer system 400 that is to implement the functionality described herein.

The computer system 400 also may include an input device interface 422 (e.g., input device interface and/or output device interface). The input device interface 422 may be configured to receive input and selections to be communicated to the computer system 400 when executing instructions, such as from a keyboard, mouse, touch-sensitive surface, etc. Such input devices may be connected to the processor device 402 through the input device interface 422 coupled to the system bus 406 but can be connected through other interfaces such as a parallel port, an Institute of Electrical and Electronic Engineers (IEEE) 1394 serial port, a Universal Serial Bus (USB) port, an IR interface, and the like. The computer system 400 may include an output device interface 424 configured to forward output, such as to a display, a video display unit (e.g., a liquid crystal display (LCD) or a cathode ray tube (CRT)). The computer system 400 may also include a communications interface 426 suitable for communicating with a network as appropriate or desired.

The operational steps described in any of the exemplary aspects herein are described to provide examples and discussion. The steps may be performed by hardware components, may be embodied in machine-executable instructions to cause a processor to perform the steps, or may be performed by a combination of hardware and software. Although a specific order of method steps may be shown or described, the order of the steps may differ. In addition, two or more steps may be performed concurrently or with partial concurrence.

FIG. 5 schematically illustrates a processor device 500 according to at least one exemplary embodiment of the present disclosure. The processor device 500 in FIG. 5 may, for instance, correspond to the processor device 402 in FIG.

4. FIG. 5 illustrates, in terms of a number of functional units, the components of a processor device 500 according to exemplary embodiments of the discussions herein. The processor device 500 may be comprised in any working machine disclosed herein, thus in the form of an on-board processor device 500, or as it may be comprised in a remote facility, such as in an office or in a cloud-based solution as discussed herein. Processing circuitry 510 may be provided using any combination of one or more of a suitable central processing unit CPU, multiprocessor, microcontroller, digital signal processor DSP, etc., capable of executing software instructions stored in a computer program product, e.g. in the form of a storage medium 530. The processing circuitry 510 may further be provided as at least one application specific integrated circuit ASIC, or field programmable gate array FPGA.

Particularly, the processing circuitry 510 is configured to cause the processor device 500 to perform a set of operations, or steps, such as the method discussed in connection to FIG. 3 and others examples discussed throughout this disclosure. For example, the storage medium 530 may store the set of operations, and the processing circuitry 510 may be configured to retrieve the set of operations from the storage medium 530 to cause the processor device 500 to perform the set of operations. The set of operations may be provided as a set of executable instructions. Thus, the processing circuitry 510 is thereby arranged to execute exemplary methods as herein disclosed.

The storage medium 530 may also comprise persistent storage, which, for example may be any single one or combination of magnetic memory, optical memory, solid state memory or even remotely mounted memory.

The processor device 500 may further comprise an interface 520 for communications with at least one external device such as temperature sensor, speed sensor, GPS system, and the onboard batteries discussed herein. As such, the interface 520 may comprise one or more transmitters and receivers, comprising analogue and digital components and a suitable number of ports for wireline or wireless communication.

The processing circuitry 510 controls the general operation of the processor device 500, e.g. by sending data and control signals to the interface 520 and the storage medium 530, by receiving data and reports from the interface 520, and by retrieving data and instructions form the storage medium 530. Other components, as well as the related functionality, of the processor device 500 are omitted in order not to obscure the concepts presented herein.

FIG. 6 schematically illustrates a computer program product 600 according to one example. More specifically, FIG. 6 illustrates a non-transitory computer-readable storage medium 610 carrying a computer program comprising program code means 620 for performing the methods exemplified in FIG. 3 and any examples thereof, when executed by the processor device. The computer-readable storage medium 610 and the program code means 620 may together form the computer program product 600.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the inventive concepts being set forth in the following claims.

What is claimed is:

1. A computer-implemented method of controlling future braking capacity of a vehicle travelling along a road, the vehicle having onboard batteries that are configured to absorb energy from regenerative braking, the method comprising:

acquiring, by a processor device of a computer system, prediction data indicative of how much braking capacity will be needed for the vehicle to maintain its speed in an upcoming downhill slope in which a regenerative braking event is anticipated;

controlling, by the processor device, based on the acquired prediction data, the application of resistor brakes of the vehicle before said upcoming downhill slope, thereby increasing the propulsion power needed to propel the vehicle at maintained speed; and controlling, by the processor device, a traction motor of the vehicle so that the vehicle is propelled at maintained speed while the resistor brakes are applied, thereby reducing the state of charge (SOC) of the onboard batteries and enabling the onboard batteries to subsequently absorb energy from said anticipated regenerative braking event.

2. A computer system comprising the processor device configured to perform the method of claim 1.

3. The method of claim 1, further comprising:

determining, by the processor device, a target SOC of the onboard batteries based on the acquired prediction data; and stopping, by the processor device, said application of resistor brakes when said target SOC has been reached for the onboard batteries.

4. The method of claim 3, wherein the acquired prediction data comprises a value of an expected amount of energy that the onboard batteries would absorb during the anticipated regenerative braking event in the upcoming downhill slope assuming unlimited battery capacity.

5. The method of claim 3, wherein the acquired prediction data comprises an expected future reduction in SOC due to an uphill climb before said upcoming downhill slope, assuming the applying of the resistor brakes has been stopped.

6. The method of claim 3, further comprising determining, by the processor device, based on said determined target SOC, at least one of the following parameters:

a point in time for starting said application of resistor brakes;

a location along the road for starting said application of resistor brakes; and a value of braking power, energy or torque to be applied by said resistor brakes.

7. The method of claim 6, wherein said determining of the at least one parameter comprises:

determining, by the processor device, the current speed of the vehicle; and based on the determined current speed of the vehicle, determining, by the processor device, the at least one parameter.

8. The method of claim 6, wherein said determining of the at least one parameter comprises:

determining, by the processor device, the current state of charge of the vehicle; and based on the determined current state of charge, determining, by the processor device, the at least one parameter.

9. The method of claim 6, wherein said determining of the at least one parameter comprises:

accessing, by the processor device, stored historical control data representing previous control actions by the processor device; and based on said stored historical control data, determining, by the processor device, the at least one parameter.

10. The method of claim 1, wherein said prediction data comprises information about the topography of an upcoming road segment which comprises said upcoming downhill slope, wherein said information about the topography comprises information such as a length and/or an inclination of said upcoming downhill slope.

11. The method of claim 1, wherein, in said prediction data, said braking capacity that will be needed for the vehicle in the downhill slope includes, assuming SOC is expected to reach 100% due to the anticipated regenerative braking event in the downhill slope:

an expected value of a brake torque, power or energy to be applied by mechanical brakes of the vehicle in the downhill slope following said anticipated regenerative braking event; and/or an expected value of energy to be dumped into the resistor brakes following said anticipated regenerative braking event.

12. The method of claim 1, wherein said vehicle is a fuel cell electric vehicle (FCEV), a battery electric vehicle (BEV) or a hybrid vehicle.

13. A vehicle comprising the processor device to perform the method of claim 1.

14. A computer program product comprising program code for performing, when executed by the processor device, the method of claim 1.

15. A control system comprising one or more control units configured to perform the method according to claim 1.

16. A non-transitory computer-readable storage medium comprising instructions, which when executed by the processor device, cause the processor device to perform the method of claim 1.

\* \* \* \* \*